United States Patent [19]
Sawyer

[11] Patent Number: 5,846,586
[45] Date of Patent: Dec. 8, 1998

[54] COMPOSITE SHRIMP PRODUCT AND PROCESS

[75] Inventor: Paul J. Sawyer, Treasure Island, Fla.

[73] Assignee: Richard Stowell, St. Petersburg, Fla.; a part interest

[21] Appl. No.: 698,394

[22] Filed: Aug. 15, 1996

[51] Int. Cl.⁶ .................................................. A22C 29/02
[52] U.S. Cl. .......................... 426/274; 426/296; 426/643
[58] Field of Search .................................... 426/104, 132, 426/140, 138, 274, 643, 92

[56] References Cited

U.S. PATENT DOCUMENTS

| | | | |
|---|---|---|---|
| 2,903,365 | 9/1959 | O'Brian | 426/104 |
| 3,852,505 | 12/1974 | Rubin . | |
| 4,092,435 | 5/1978 | Teijero . | |
| 4,341,800 | 7/1982 | Lester | 426/132 |
| 4,411,917 | 10/1983 | Chang | 426/104 |
| 4,474,823 | 10/1984 | Nishikawa et al. . | |
| 4,816,276 | 3/1989 | Blazevich | 426/643 |
| 4,824,687 | 4/1989 | Yasuno | 426/643 |
| 4,855,158 | 8/1989 | Kawana | 426/643 |
| 4,900,570 | 2/1990 | Matsubara | 426/643 |
| 4,919,957 | 4/1990 | Ikeuchi et al. | 426/513 |
| 5,013,230 | 5/1991 | Ikeuchi et al. | 426/127 |
| 5,176,932 | 1/1993 | Sugino | 426/643 |
| 5,431,938 | 7/1995 | Kou | 426/291 |

OTHER PUBLICATIONS

Womans Day Encyclopedia of Cookery vol. 10 1966 Fawcett Publications Inc New York 1655–1657.

Gisslen 1995 Professional Cooking 1995 John Wiley & Sons Inc New York pp. 344–346, 362, 362.

Cooking Light Cookbook 1993 Oxmoor House Birmingham Alabama p. 101.

Cooking Light Cookbook 1992 Oxmoor House Birmingham Alabama pp. 113 and 120.

Primary Examiner—Carolyn Paden
Attorney, Agent, or Firm—David Kiewit

[57] ABSTRACT

A seafood product, generally having the appearance of a single large shrimp, is made from two or more shrimp carcasses. A first of the shrimp carcasses has a throughhole formed in it and may have the shell left on its tail segment. The other shrimp, on the other hand, is completely shelled. The tail segment of a completely shelled shrimp carcass is inserted through the throughhole in the first shrimp carcass, and may be thereafter split axially. The spread apart split portions of the inserted tail segment can act to mechanically interconnect the two shrimp carcasses into a composite seafood product that can be handled in a thawed or a frozen state. The composite seafood product may mimic the appearance of a butterflied shrimp, or of a round shrimp, or it may appear unlike any naturally occurring shrimp.

14 Claims, 3 Drawing Sheets

COMPOSITE SHRIMP PRODUCT AND PROCESS

BACKGROUND OF THE INVENTION

1. Field of the Invention

The invention pertains to seafood products and specifically provides a composite shrimp product and a process for making the same by interlocking two or more small shrimp carcasses to form a single composite product having the appearance of a larger shrimp.

2. Description of Prior Art

In U.S. Pat. No. 5,431,938, Kou teaches a method of freezing two or more butterflied and partially dusted shrimp together to form a single composite having the appearance of a single large shrimp. These frozen composite products are distributed to restaurants where they are coated with a batter and deep-fat fried. Kou's process employs a special tray having a plurality of depressions. White flour, or other suitable dusting material, is initially sprinkled into the depressions and a first butterflied shrimp carcass is placed on the flour. A second butterflied shrimp body is then placed atop the first and the composite is again dusted before being blast frozen. This sequence of steps places undusted surfaces of the two shrimp in direct contact so they can be joined by blast freezing. The process provides a shrimp composite with its exposed surfaces lightly dusted with flour. This dusting is important because it allows a subsequently applied batter to stick to the frozen product.

A serious shortcoming of Kou's process is that it yields a product that must remain frozen up to the point of frying. If one of Kou's composite shrimp fully thaws before the batter surrounding it has cooked sufficiently to hold the composite together, the two shrimp carcasses separate and the desired illusion—i.e., that the composite shrimp product is a single large shrimp—is ruined.

Another shortcoming of Kou's process is that it yields a composite shrimp product having the appearance of a single large shrimp only if the final product is served as deep-fried butterflied shrimp. His process does not address other forms in which shrimp are presented at table. In particular, Kou provides no simulation of what is conventionally called a "round shrimp"—i.e., one that has been deheaded, peeled (save for the tail segment, on which the shell sometimes remains), and deveined, but neither butterflied nor cut into any other shape.

In U.S. Pat. No. 4,919,957 and U.S. Pat. No. 5,013,230 Ikeuchi et al. disclose apparatus and method for making a molded composite seafood product having the shape of a shrimp. Their apparatus comprises a compression tool that, when pressed into the seafood product, spreads portions of the seafood product apart to form a groove having the appearance of a deveining groove cut into the back of an actual shrimp.

Both Rubin (in U.S. Pat. No. 3,852,505) and Teijeiro (in U.S. Pat. No. 4,092,435) describe processes of making a composite shrimp product from flaked or brayed shrimp. Both form a composite shrimp-shaped product out of the small bits and pieces. Rubin teaches a high pressure molding process that relies on precisely controlled trituration to ensure that proteins in the shrimp provide a high degree of adhesive bonding so that additional binding ingredients can be omitted. Teijeiro uses flaked shrimp treated with lemon juice and monosodium glutamate, and then extruded into a shrimp-like shape and pre-cooked prior to shipping. Both Rubin and Teijeiro teach that their composite seafood products can be handled at temperatures above freezing and can be prepared for the table either by being batter-fried or being boiled.

SUMMARY OF THE INVENTION

In accordance with a preferred embodiment of the present invention a seafood product, generally having the appearance of a single large shrimp, is made from two or more shrimp carcasses. A first of the shrimp carcasses is at least partially shelled (i.e., it may have the shell left on its tail portion) and has a throughhole formed in it. The tail segment of another, completely shelled, shrimp carcass is inserted through the throughhole in the first shrimp carcass to attach the two carcasses and thereby form the composite product. The tails segment of the inserted shrimp may be split axially and the two portions splayed apart to effect a superior mechanical attachment of the two shrimp carcasses.

It is an object of the invention to provide an unfrozen composite shrimp product comprising two or more interconnected shrimp carcasses and having the appearance of a single large shrimp. It is specifically an object of the invention to provide such a composite product having the appearance of a single large butterflied shrimp. It is an additional specific object of the invention to provide such a composite product having the appearance of a single large round shrimp.

It is yet a further object of the invention to provide a method of making a composite shrimp product comprising two or more shrimp carcasses and having the appearance of a single large shrimp, the composite product made by a process not requiring the use of a pocketed tray for assembly of the composites.

It a still further object of the invention to provide a method of making a composite shrimp product comprising two or more shrimp carcasses and having the appearance of a single large shrimp, the composite product made by a process not requiring a freezing step to join the two or more shrimp carcasses.

It is additionally an object of the invention to provide a method of making a plurality of composite frozen shrimp products, each composite product comprising two shrimp carcasses and having the appearance of a single large frozen shrimp, each composite frozen product made by mechanically joining two unfrozen shrimp carcasses and freezing the resultant composite separately from any other such resultant composite. It is a specific object of the invention to freeze resultant composites by spatially separating them on a conveyor means and thereafter conveying them through a spiral freezer. It is yet a further specific object of the invention to freeze the resultant composites by spatially separating them and thereafter freezing them by a contact or blast freezing process.

DESCRIPTION OF THE PREFERRED EMBODIMENT

Figure 1:
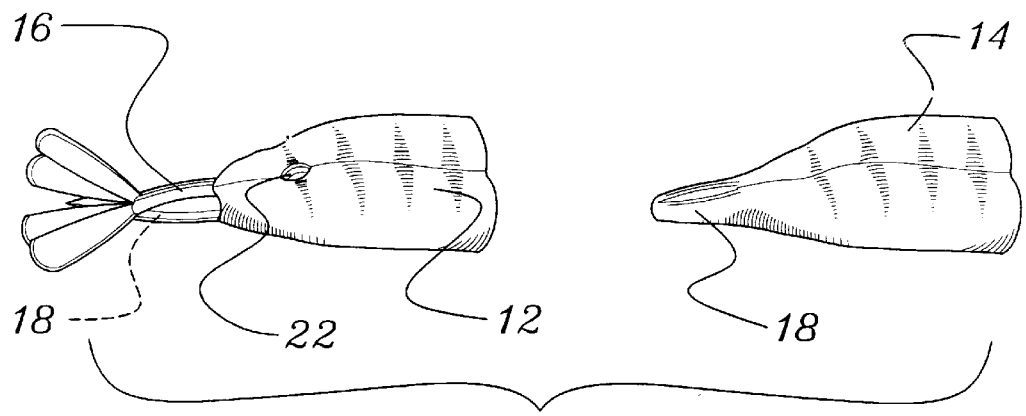
FIG. 1 is an elevational view of two butterflied shrimp carcasses prepared for interlocking.

A composite seafood product 10, having the appearance of a single large shrimp carcass is prepared by mechanically connecting two individual shrimp carcasses 12, 14. A first 12 shrimp carcass is initially prepared by deheading, partially or entirely shelling, deveining, and butterflying in a conventional fashion by making a dorsal butterfly slit along a portion of the sagittal plane of the carcass, the butterfly slit not extending all the way through the carcass to the ventral side thereof, the butterfly slit defining two butterfly portions of the shrimp carcass of opposite sides of the sagittal plane thereof. The butterflied first shrimp carcass preferably has the tail shell 16 left on the tail segment 18 thereof, as is conventional in the preparation of butterflied shrimp. The second shrimp carcass 14 is prepared by deheading, entirely shelling, and deveining—i.e., the second shrimp carcass 14 has a shelled tail segment 18. If the final composite shrimp 10 is intended to simulate the appearance of a single large butterflied shrimp, the second shrimp carcass 14 is butterflied, as depicted in FIGS. 1–4 of the drawing. If, on the other hand, the composite shrimp 10 is to mimic a round shrimp (i.e., a shrimp carcass that has been shelled (except for, possibly, the tail segment thereof) and deveined, but that has not been butterflied, the second shrimp carcass 14 is not butterflied (i.e., as depicted in FIGS. 5–7).

Figure 2:
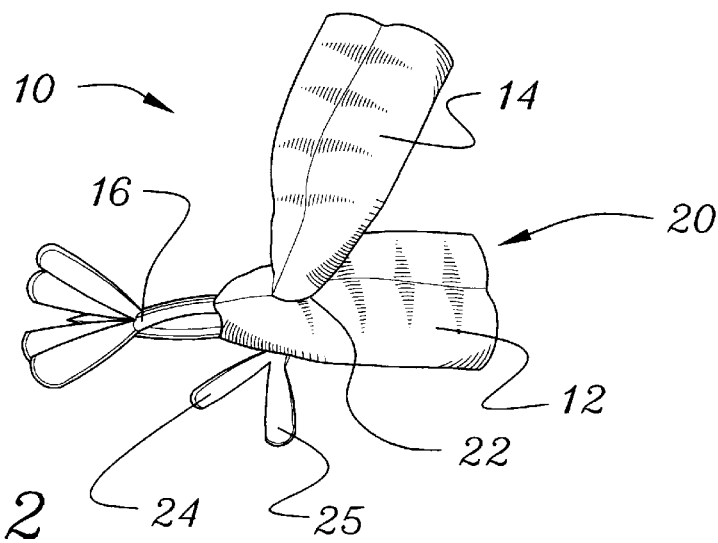
FIG. 2 is an elevational view of an intermediate step in the joining process using the shrimp carcasses of FIG. 1.
Figure 3:
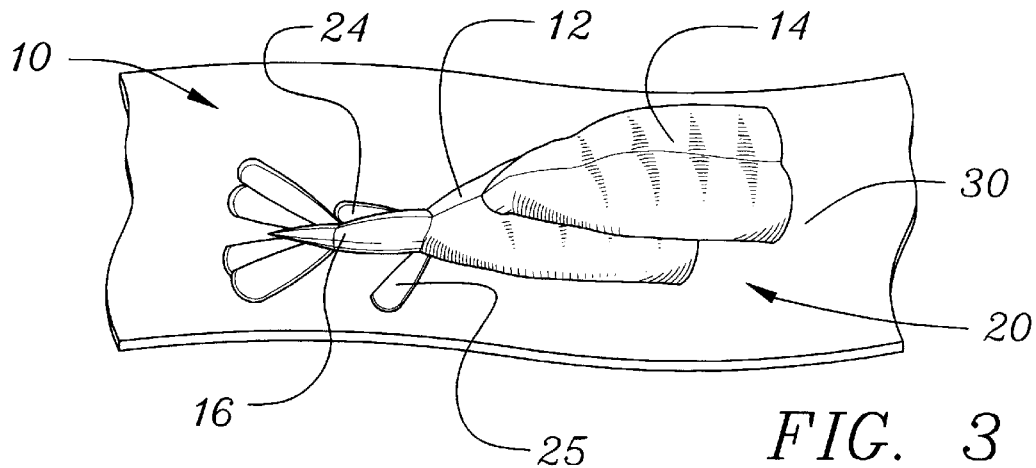
FIG. 3 is a plan view of two interlocked butterflied shrimp carcasses on a conveyor.
Figure 4:
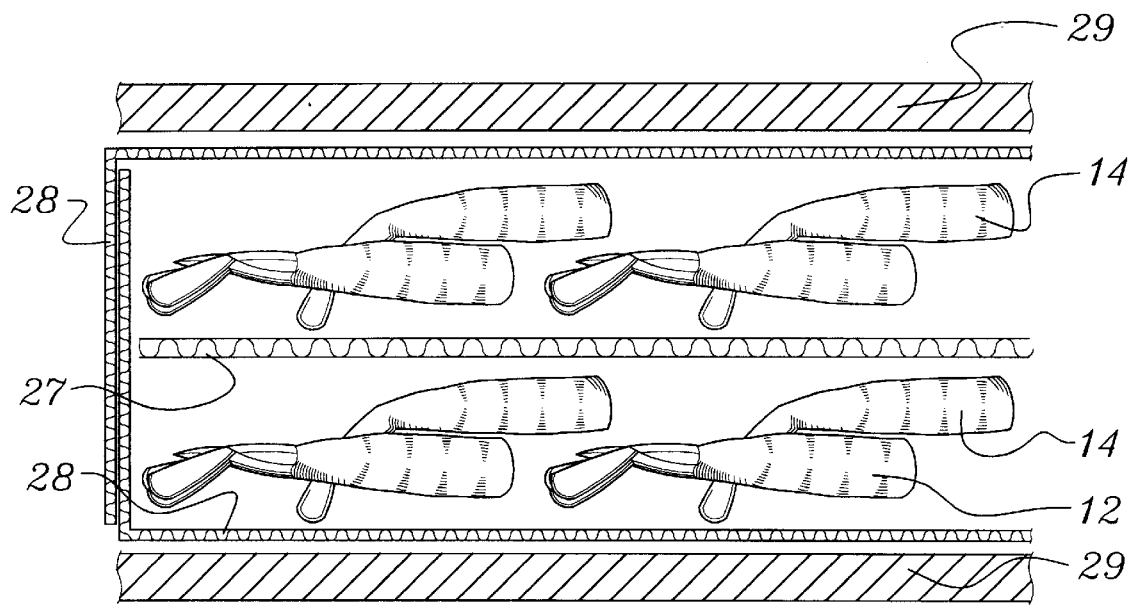
FIG. 4 is partly cut-away view showing the shrimp product in an arrangement used for contact freezing.

Turning now to FIGS. 1–4, one finds a depiction of several steps in a process of making a composite butterflied shrimp 20 from first 12 and second 14 prepared shrimp carcasses. A throughhole 22 is made in the first shrimp carcass 12 along or intersecting the butterfly slit made along the centerline of the carcass 12. The size of this throughhole 22 is chosen to accommodate the tail segment 18 of the second shrimp carcass 14, which is inserted through the throughhole 22 as depicted in FIG. 2. The tail segment 18 of the second shrimp 14 is preferably bifurcated along a line running from the caudal end of the shrimp carcass 14 into the tail segment 18. In a preferred embodiment, this bifurcating slit may be disposed along the sagittal plane of the second shrimp carcass 14. After the tail 18 of the second shrimp 14 is inserted through the throughhole 22, the two tail portions 24, 25 defined by the bifurcating slit may be spread apart from each other in the splayed attitude depicted in FIGS. 2–3 so as to lock the two shrimp carcasses 12, 14 together by means analogous to a buttoning or riveting operation. It may be noted that this preferred approach is not necessary to the invention, but does provide superior locking strength. Initial samples of the composite shrimp 10 of the invention were made without bifurcating the tail segment 18 of the second shrimp 14. These initial samples could be handled in an unfrozen state, but were easier to pull apart than are the preferred composite shrimps 10 that use the bifurcated tail segment 18.

Figure 5:
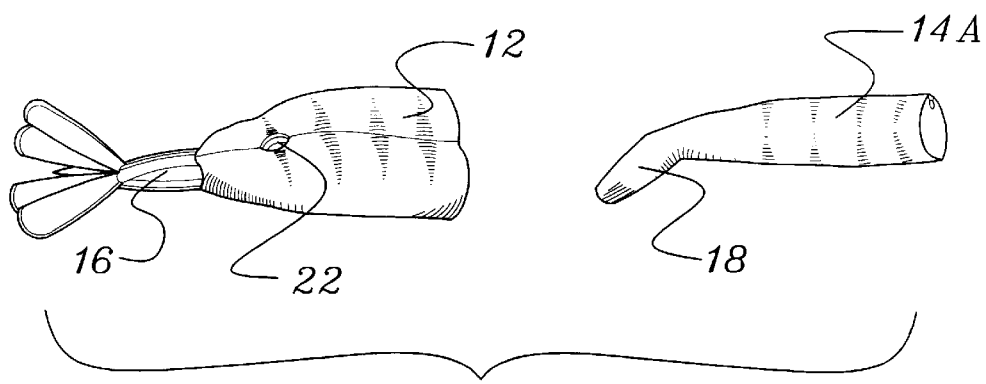
FIG. 5 is an elevational view of two shrimp carcasses that are to be joined to form a round composite shrimp.
Figure 6:
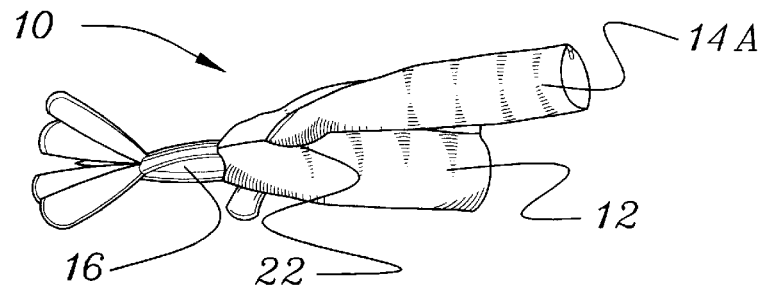
FIG. 6 is an elevational view of the joining process using the shrimp carcasses of FIG. 5.
Figure 7:
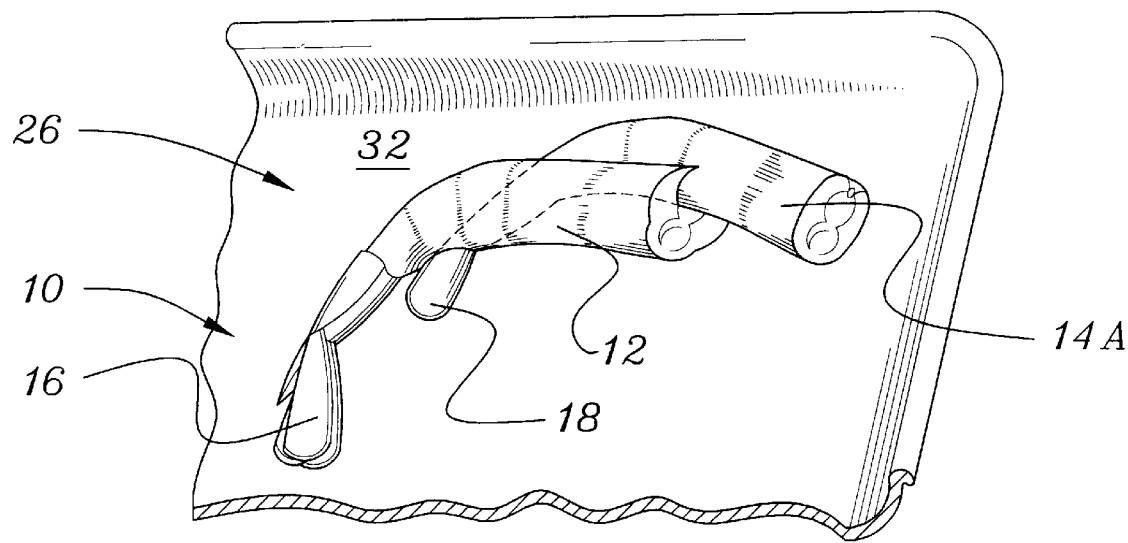
FIG. 7 is an elevational view of the composite round shrimp disposed on a tray for blast freezing.

Turning now to FIGS. 5–7, one finds a depiction of several steps in a process of making a composite tail-on round shrimp 26 from first 12 and second 14A prepared shrimp carcasses. The second carcass 14A, when used for preparation of a round composite shrimp 26, is left in the round, rather than being butterflied. As before, a throughhole 22 is made in the first shrimp carcass 12 along or adjacent the centerline thereof and the second shrimp carcass 14A is inserted through the throughhole 22, as depicted in FIG. 6. The tail segment 18 of the second shrimp 14A is bifurcated along a line running from the caudal end of the shrimp carcass 14A into the tail segment 18, and the two tail portions 24, 25 defined by the bifurcating slit are spread apart from each other so as to interlock the two carcasses 12, 14A. Portions of the first shrimp carcass 12 defined by the butterfly slit are then brought into abutting contact with the inserted second carcass 14A, as depicted in FIG. 7 to yield a wrapped composite seafood product 26 having the appearance of a tail-on round shrimp.

Figure 9:
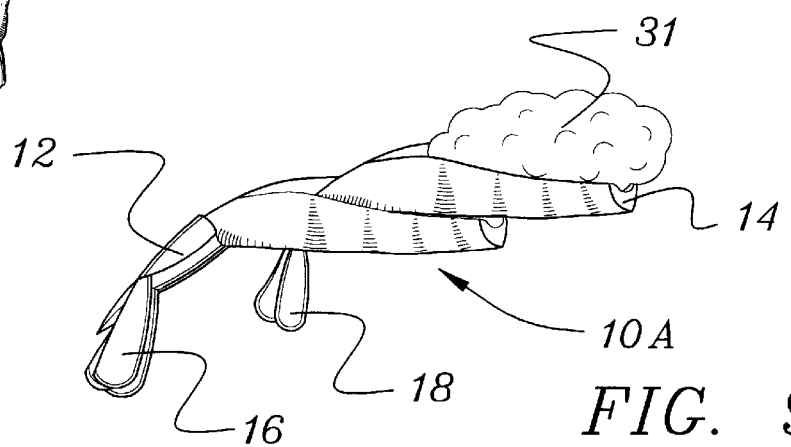
FIG. 9 is an elevational view of a butterfly stuffed composite shrimp.

Several variations in both the use and the cosmetic appearance of the composite shrimp 10 may be provided by cutting the throughhole 22 at various locations along the centerline of the first shrimp carcass 12. These variations have the effect of changing the ratio of the composite shrimp's 10 length (measured along the centerline of the two or more carcasses making up the composite shrimp 10) to its width (measured transverse thereto). If the throughhole 22 is disposed relatively close to the tail segment 18 of the first shrimp 12, the length to width ratio is less that what one would find from a natural shrimp. That is, the resultant composite shrimp 10 appears to have an unnaturally thick, short body (A wide body of this sort may advantageously be wrapped about a suitable known stuffing material to yield a composite stuffed shrimp 10A, as depicted in FIG. 9). Conversely, if the throughhole 22 is made near the end of the first shrimp carcass 12 distal from the tail segment 18, the resultant composite shrimp 10 is long and narrow, and may indeed have a length to width ratio greater than the corresponding ratio for any real shrimp. It is notable that an unnaturally long and narrow composite shrimp 10 of this sort would have a greater batterable or breadable surface area per unit weight of shrimp meat than would a natural shrimp. This control of batterable area per unit weight or per count of composite shrimp products 10 is expected to be attractive to some buyers of the product 10. Because the length to width ratio can be changed beyond the extremes found in nature, it is clear that the choice of the position of the throughhole 22 can be used to mimic all natural shrimp.

Figure 8:
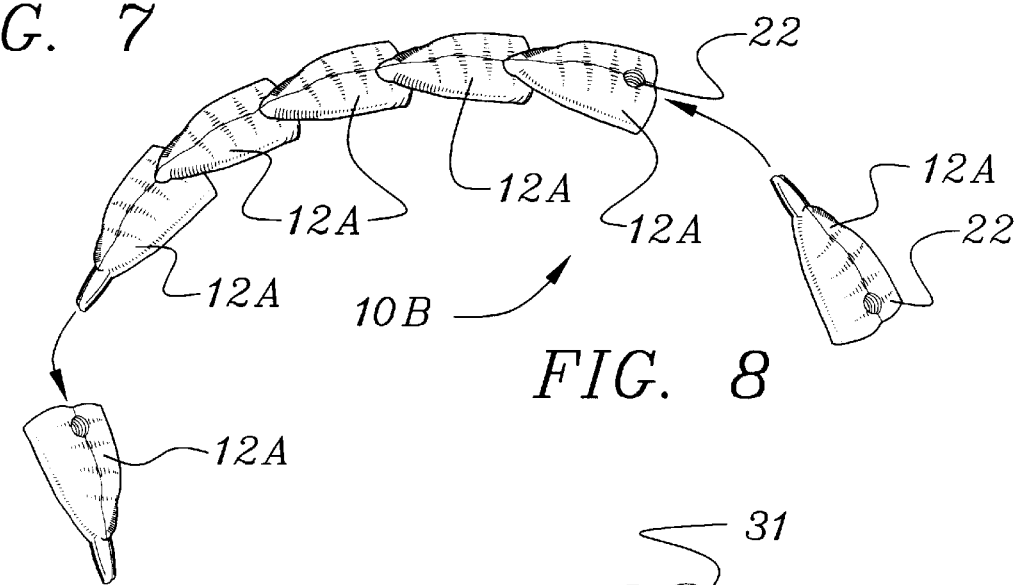
FIG. 8 is an elevational view of a composite shrimp product made by interconnecting more than two shrimp.

Although the detailed description hereinbefore provided discloses a preferred arrangement of making a composite shrimp 10 by interlocking two shrimp 12, 14, wherein the first 12 of these shrimp has the tail shell left on and the second 14 does not, it should be clear that one could equally well remove the tail shell 16 from the first shrimp 12 prior to attaching the second shrimp 14. Moreover, the process of the invention is not limited to linking two shrimp carcasses 12, 14. Both the process and the composite shrimp 10 may be extended by linking in additional shrimp carcasses. As depicted in FIG. 8, a plurality of fully shelled shrimp carcasses 12A, each having a throughhole 22, may be interlocked as taught supra to yield either a very long composite shrimp 10B, or the plurality of carcasses 12A may be interlocked to form a ring.

This process of connecting the shrimp carcasses 12, 14 together is, of course, carried out using unfrozen carcasses 12, 14 that need not be precooked. The process yields a composite shrimp 10 that may be handled (e.g., picked up by the tail 18 of the first shrimp 12) without causing the composite shrimp 20 to fall apart. Although this mechanical arrangement for connecting the two shrimp 12, 14 allows for ready disassembly of the composite shrimp 10, the arrangement is adequately strong to resist accidental disassembly and therefore aids in maintaining the desired illusion that the ultimate consumer is being presented with a single large shrimp rather than a clearly delineated composite 10 of two 12, 14 carcasses.

The composite shrimp 10 of the invention may, of course, be frozen for distribution, and may be thawed before cooking at the site where it is to be consumed. Because the composite shrimp 10 can be handled as either a frozen or a thawed product, a wide variety of known freezing and handling techniques can be employed. The composite shrimp product 10 of the invention can be frozen by any of a number of known methods. For example, they may be contact frozen (e.g., by arranging a plurality of the composite shrimp 10 in layers separated by waxed cardboard separators 27 in a box 22 placed between refrigerated shelves 29); or, the composite shrimp 10 may be conveyed through a cold chamber on a suitable conveying means 30 (a process often called "spiral freezing" because the conveying means 30 commonly follows a spiral path through the cold chamber). Alternately, the composite shrimp 10 may more slowly frozen by the known "blast freezing" process that involves placing a plurality of composite shrimp 10 on a suitable flat tray or shelf 32 in a cold chamber.

If desired, the composite shrimp 10 can be batter-coated or breaded prior to freezing, and distributed in a ready-to-cook state. Alternately, the composite shrimp 10 may be battered and dropped into hot fat while still frozen. Moreover, the composite shrimp 10 of the invention may be frozen without coating and thereafter delivered to a final preparer thereof who thaws, breads or batters, and cooks it.

Although the present invention has been described with respect to several preferred embodiments, many modifications and alterations can be made without departing from the invention. Accordingly, it is intended that all such modifications and alterations be considered as within the spirit and scope of the invention as defined in the attached claims.

I claim:

1. A coated composite seafood product adapted to be handled without accidental disassembly prior the consumption thereof, the coated composite product comprising, in combination, a first deheaded, deveined shrimp carcass having a shell removed from at least all but a tail segment thereof, the first shrimp carcass having a butterfly slit formed therein, the first shrimp carcass having a throughhole along or intersecting the butterfly slit;

a second deheaded and deveined shrimp carcass having the shell entirely removed therefrom, the second shrimp carcass having a tail segment thereof inserted through the throughhole in the first shrimp carcass thereby forming a composite product ; and a coating disposed about the composite product, whereby the coated composite product simulates a single coated shrimp carcass larger than either the first or the second shrimp carcass.

2. The composite seafood product of claim 1 further comprising a bifurcating slit in the tail segment of the second shrimp.

3. The composite seafood product of claim 1 wherein the shell is not removed from the tail segment of the first shrimp carcass and wherein the second shrimp carcass has a butterfly slit formed therein.

4. The composite seafood product of claim 1 wherein the shell is not removed from the tail segment of the first shrimp carcass, wherein the second shrimp carcass is a round carcass, and wherein a butterfly portion of the first shrimp carcass is brought into abutting contact with the second shrimp carcass.

5. The composite seafood product of claim 1 wherein the throughhole is adjacent the tail segment of the first shrimp, whereby the composite product has a length to width ratio less than that of a natural shrimp carcass.

6. The composite seafood product of claim 1 wherein the throughhole is distal from the tail segment of the first shrimp, whereby the composite product has a length to width ratio greater than that of a natural shrimp carcass.

7. A method of preparing a coated composite seafood product adapted to resist accidental disassembly prior to the consumption thereof, the method comprising the steps of:

a) deheading a first unfrozen shrimp carcass, removing at least all but a tail segment of a shell therefrom, deveining the first shrimp carcass and forming therein a dorsal butterfly slit defining two butterfly portions;

b) cutting a throughhole in the first shrimp carcass, the throughhole along or intersecting the butterfly slit;

c) deheading, shelling, and deveining a second unfrozen shrimp carcass d) inserting a tail segment of the second shrimp carcass through the throughhole, thereby forming a composite product having the appearance of a single large shrimp larger than either the first shrimp carcass or the second shrimp carcass;

e) coating the composite product;

f) cooking the coated composite product;and g) presenting the coated composite product to the ultimate consumer.

8. The method of claim 7 further comprising a first additional step, prior to step d), of: forming a bifurcating slit in the tail segment of the second shrimp carcass and a second additional step subsequent to step d) of spreading apart the two portions of the tail segment defined by the bifurcating slit.

9. The method of claim 7 further comprising steps, after step e) and prior to step f), of:

e1) freezing the composite shrimp; and e2) shipping the frozen composite shrimp to a site where it is to be consumed.

10. The method of claim 7 wherein the coating operation of step e) comprises dusting the composite shrimp; the method further comprising additional steps subsequent to step e) and prior to step f) of:

e1) freezing the dusted composite shrimp;

e2) shipping the frozen dusted composite shrimp to a site where it is to be consumed; and e3) coating the frozen dusted composite shrimp with a batter.

11. The method of claim 7 further comprising a step, intermediate steps c) and d) of: c1) forming a second butterfly slit in the second shrimp carcass.

12. The method of claim 7 further comprising a step, subsequent to step d)and prior to step e) of d1) bringing the two butterfly portions of the first shrimp carcass into abutting contact with the second shrimp carcass, thereby forming a wrapped composite product.

13. The method of claim 7 further comprising steps, intermediate steps c) and d) of c1) forming a second butterfly slit in the second shrimp carcass;

c2) cutting a second throughhole in the second shrimp carcass, the second throughhole adjacent the second butterfly slit;

the method further comprising steps, after step d) and prior to step e) of d1) deheading, shelling, and deveining a third unfrozen shrimp carcass; and
  d2) inserting a tail segment of the third shrimp carcass through the second throughhole in the second shrimp carcass.

14. The method of claim 7 further comprising steps, after step d) and prior to step e), of:

d1) freezing the composite shrimp; and
  d2) shipping the frozen composite shrimp to a site where it is to be consumed.

* * * * *